(12) United States Patent
Wiebold et al.

(10) Patent No.: US 10,591,312 B2
(45) Date of Patent: Mar. 17, 2020

(54) WHISPERING GALLERY MODE BASED RANGE-RESOLVED AIR DATA SYSTEM

(71) Applicant: Honeywell International Inc., Morris Plains, NJ (US)

(72) Inventors: Matthew Wiebold, Northfield, MN (US); Grant Lodden, Minnetrista, MN (US); Dominique Fourguette, Stevenson Ranch, CA (US); Xiao Zhu Fan, Plymouth, MN (US); David Johnson, Canton, MI (US); Jane Pavlich, Ann Arbor, MI (US); David Zuk, Dexter, MI (US)

(73) Assignee: Honeywell International Inc., Morris Plains, NJ (US)

( * ) Notice: Subject to any disclaimer, the term of this patent is extended or adjusted under 35 U.S.C. 154(b) by 267 days.

(21) Appl. No.: 15/668,563

(22) Filed: Aug. 3, 2017

(65) Prior Publication Data

US 2018/0224299 A1    Aug. 9, 2018

Related U.S. Application Data

(60) Provisional application No. 62/456,524, filed on Feb. 8, 2017.

(51) Int. Cl.
*G01C 3/08* (2006.01)
*G01C 23/00* (2006.01)
(Continued)

(52) U.S. Cl.
CPC .............. *G01C 23/00* (2013.01); *G01K 11/00* (2013.01); *G01L 11/02* (2013.01); *G01P 5/26* (2013.01);
(Continued)

(58) Field of Classification Search
CPC ...... G01S 7/4802; G01S 7/4816; G01S 17/10; G01S 17/89; G01S 17/95; G01S 17/58;
(Continued)

(56) References Cited

U.S. PATENT DOCUMENTS 5,260,762 A    11/1993  Telle
7,630,417 B1   12/2009  Maleki et al.
(Continued)

FOREIGN PATENT DOCUMENTS

EP      3067713         9/2016
WO      2016164435 A1   10/2016

OTHER PUBLICATIONS

European Patent Office, "Extended European Search Report for EP Application No. 18154559.1", Foreign Counterpart to U.S. Appl. No. 15/668,563, dated Mar. 20, 2018, pp. 1-9, Published in: EP.
(Continued)

*Primary Examiner* — Mark Hellner
(74) *Attorney, Agent, or Firm* — Fogg & Powers LLC (57) ABSTRACT

A system for obtaining air data for a vehicle comprises a laser device that emits laser light pulses, and transmit optics that transmits the light pulses into an external air volume adjacent to the vehicle. The system also includes receive optics that collects scattered portions of the light pulses from the external air volume, and a whispering gallery mode (WGM) frequency discriminator that receives the scattered portions of the light pulses from the receive optics. The WGM frequency discriminator includes at least one WGM resonator that outputs a selected portion of the light pulses at one or more optical signal frequencies via tuning the WGM resonator other than by an electro-optic effect. An optical detector samples the selected portion of the light pulses from the WGM frequency discriminator, and converts the sampled light pulses to scalar values. A processing unit
(Continued)

receives and records the scalar values from the optical detector.

19 Claims, 5 Drawing Sheets

(51) Int. Cl.
| | |
|---|---|
| *G01P 5/26* | (2006.01) |
| *G01K 11/00* | (2006.01) |
| *G01L 11/02* | (2006.01) |
| *G01S 7/48* | (2006.01) |
| *G01S 17/58* | (2006.01) |
| *G01S 17/10* | (2020.01) |
| *G01S 7/481* | (2006.01) |
| *G01S 17/89* | (2020.01) |
| *G01S 17/95* | (2006.01) |
| *G01S 17/42* | (2006.01) |

(52) U.S. Cl.
CPC .......... *G01S 7/4802* (2013.01); *G01S 7/4816* (2013.01); *G01S 17/10* (2013.01); *G01S 17/58* (2013.01); *G01S 17/89* (2013.01); *G01S 17/95* (2013.01); *G01S 17/42* (2013.01); *Y02A 90/19* (2018.01)

(58) Field of Classification Search
CPC ......... G01S 17/42; Y02A 90/19; G01C 23/00; G01P 5/26; G01K 11/00; G01L 11/02
USPC ....................................................... 356/4.01
See application file for complete search history.

(56) References Cited

U.S. PATENT DOCUMENTS

| | | | |
|---|---|---|---|
| 8,743,372 B2 | 6/2014 | Fourguette et al. | |
| 9,413,471 B2 | 8/2016 | Karras et al. | |
| 2005/0128566 A1 | 6/2005 | Savchenkov et al. | |
| 2015/0285728 A1 | 10/2015 | Ozdemir et al. | |
| 2016/0299228 A1 | 10/2016 | Maleki et al. | |
| 2018/0081045 A1* | 3/2018 | Gylys | G01S 17/08 |
| 2018/0180739 A1* | 6/2018 | Droz | G01S 7/487 |

OTHER PUBLICATIONS

Maleki, "Novel Lasers: Whispering-Gallery-Mode Resonators Create Ultranarrow-Linewidth Semiconductor Lasers", Laser Focus World 50(10): 27-30, Oct. 7, 2014, pp. 1-7, Publisher: Novel Lasers.
European Patent Office, "Communication pursuant to Article 94(3) from EP Application No. 18154559.1 dated Apr. 18, 2019", from Foreign Counterpart to U.S. Appl. No. 15/668,563, pp. 1-4, Published: EP.

* cited by examiner

WHISPERING GALLERY MODE BASED RANGE-RESOLVED AIR DATA SYSTEM

CROSS REFERENCE TO RELATED APPLICATION

This application claims the benefit of priority to U.S. Provisional Application No. 62/456,524, filed on Feb. 8, 2017, which is herein incorporated by reference.

BACKGROUND

Light detection and ranging (LiDAR) based air data systems interrogate molecular and aerosol populations around an aircraft to derive air data parameters such as airspeed, angle of attack, angle of sideslip, air pressure, and air temperature. These air data systems typically use macroscopic, free-space optical components including Fabry-Perot interferometers, lenses, and mirrors. Use of such components leads to systems that are large, costly, and power consuming, while being sensitive to environmental changes such as vibration or temperature.

SUMMARY

A system for obtaining air data for a vehicle is disclosed herein. The system comprises a laser device on the vehicle that emits laser light pulses, and a set of transmit optics configured to transmit the laser light pulses from the laser device into an external air volume adjacent to the vehicle. The system also includes a set of receive optics configured to collect scattered portions of the laser light pulses from the external air volume, and a whispering gallery mode (WGM) frequency discriminator configured to receive the scattered portions of the laser light pulses from the receive optics. The WGM frequency discriminator includes at least one WGM resonator configured to output a selected portion of the laser light pulses at one or more optical signal frequencies via tuning the WGM resonator other than by an electro-optic effect. An optical detector is configured to sample the selected portion of the laser light pulses from the WGM frequency discriminator, and to convert the sampled laser light pulses to one or more scalar values. A processing unit is operative to receive and record the one or more scalar values from the optical detector.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A whispering gallery mode (WGM) based range-resolved air data system is disclosed and described herein. The air data system can be implemented using a pulsed laser and a spatially scanned monostatic or bistatic transmit/receive apparatus, to range resolve air data information at different look angles to derive three-dimensional (3D) maps of wind speed, air speed, static pressure, static temperature, and the like. The look angles can be obtained by one or more of mechanically, electrically, or optically scanning the laser and receive optics. In addition, the present system provides a way to frequency discriminate the Rayleigh and Mie backscatter to derive air data parameters.

A WGM resonator is used in place of a conventional Fabry-Perot interferometer in the present air data system, which allows for cost, size, weight, and power (CSWaP) reductions, as well as improved environmental stability. These CSWaP reductions enable use of the air data system on various vehicle platforms, such as lighter than air vehicles, high altitude long endurance aircraft, and hypersonic vehicles, where size, weight and power minimization is crucial. Utilizing a WGM resonator also allows for short range and long range interrogation, matching the capabilities of macroscopic counterparts.

The air data system has various technical benefits, including an unprecedented CSWaP for a LiDAR-based air data system; range-resolved air speed, static temperature, and static pressure around a vehicle; 3D map generation of wind speed, air speed, static pressure, and static temperature; ease of fabrication and integration; improved integration robustness; and very fast processing capability.

Other advantages of the air data system include overall system CSWaP reduction, such as reduced weight, providing a corresponding fuel savings and usability on a more diverse set of platforms. In addition, the 3D wind mapping capability opens up new applications such as turbulence detection, and the ability to derive more efficient flight paths for vehicles that ride opportunistic winds.

Further details of the air data system are described hereafter with reference to the drawings.

Figure 1:
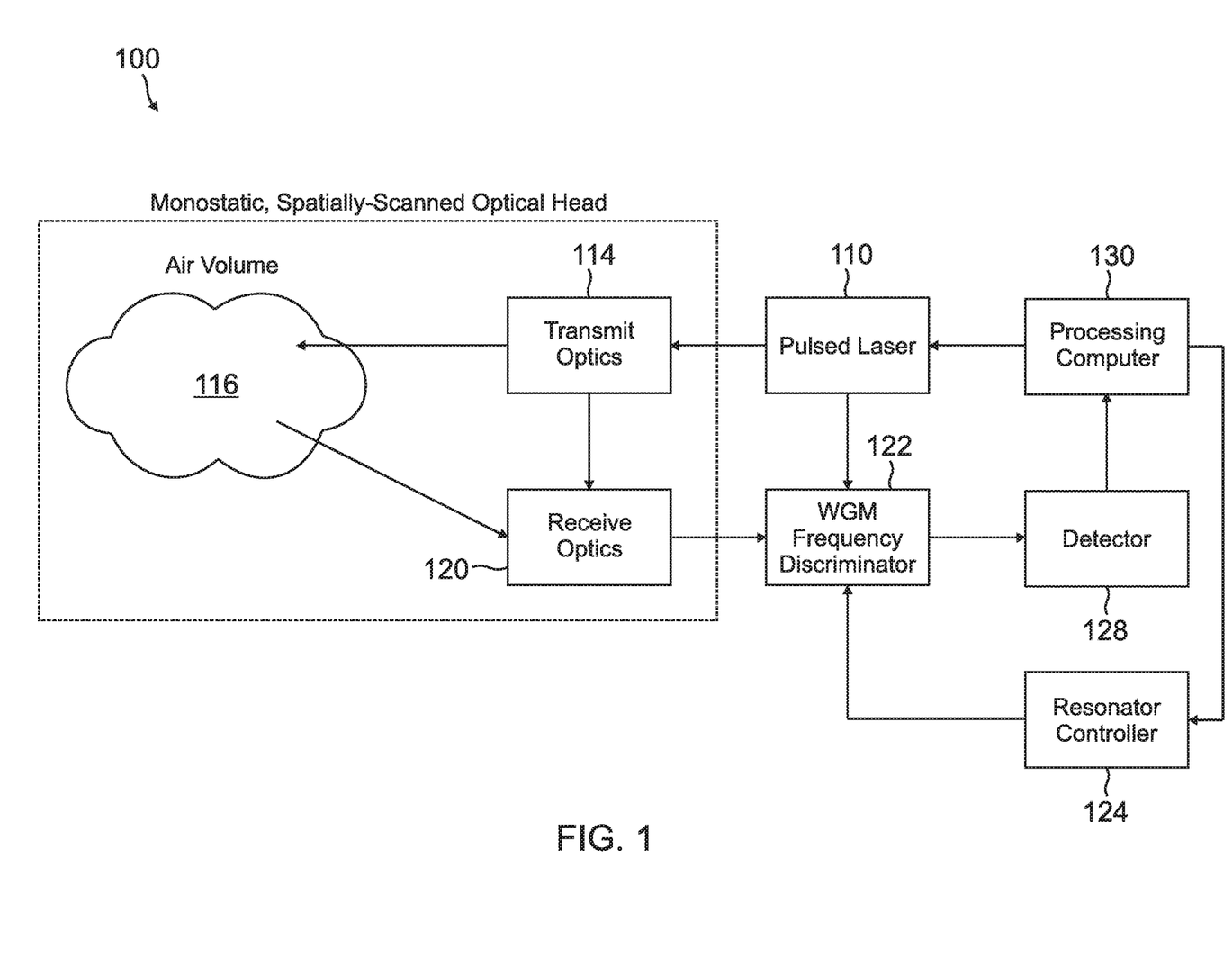
FIG. 1 is a block diagram of an air data system, which employs whispering gallery mode (WGM) based range resolution of air data in the entire envelope around a vehicle, according to one embodiment.

FIG. 1 illustrates an air data system 100, which employs WGM based range resolution of air data in the entire envelope around a vehicle such as an airborne vehicle, according to one embodiment. The air data system 100 includes a laser device 110 configured to emit a series of short laser light pulses toward a set of transmit optics 114, which is configured to transmit the laser light pulses into an external air volume 116 adjacent to and surrounding the vehicle (not shown). The laser light pulses scatter from air molecules (Rayleigh scattering) and aerosols (Mie scattering) in air volume 116. A portion of scattered laser light from air volume 116 is collected by a set of receive optics 120. In one embodiment, the transmit optics 114 and receive optics 120 can be implemented in a monostatic, spatially-scanned optical head.

The collected laser light is coupled into a WGM frequency discriminator 122 from receive optics 120. The frequency discriminator 122 includes at least one WGM resonator, which can be operatively coupled to a resonator controller 124. In addition, a reference optical signal is sent from laser device 110 to frequency discriminator 122. In one embodiment, frequency discriminator 122 includes at least one WGM resonator configured to output a selected portion of the laser light pulses at one or more optical signal frequencies via tuning the WGM resonator other than by an electro-optic effect. For example, the WGM resonator can be controllable to have a variable resonant frequency through mechanical or thermal tuning of the WGM resonator.

A selected portion of the laser light, such as a swept optical signal, is transmitted from frequency discriminator 122 to an optical detector 128, such as a photomultiplier (PMT) or an avalanche photodiode (APD). As described further hereafter, the selected portion of the laser light is dependent on the optical condition and size of the WGM resonator(s) in frequency discriminator 122. The optical detector 128 is configured to sample the selected portion of laser light and output a scalar value that is electrically transmitted to a processing unit 130, such as a computer, which is operative to record the scalar value for further processing. The processing unit 130 is also configured to operatively communicate with resonator controller 124 and laser device 110.

Because the laser light and therefore the return signal are pulsed, the sampling must occur on a fast timescale and be gated in such a way that only a small spatial range of molecules are interrogated. The transmitted light is compared to that of the reference optical signal, and a Doppler shift from bulk air/aerosol motion is determined. The reference optical signal can be gathered from the laser pulse via scattering of the transmitted pulse from a collection window, via fiber or free-space splitting of the transmitted pulse, for example. The reference optical signal can be collected during the short time between the end of the laser pulse and the beginning of the backscatter collection, or using a secondary WGM-based or other frequency discriminator.

In one embodiment, the received scattered light is time binned starting from the emission of the laser light pulse. The elapsed time of the time binned scattered light is used to compute the range measurement with respect to the air data system. Multiple lines-of-sight or a single scanning line-of-sight can be used to create 3D maps of measurements by interrogating discrete lines-of-sight or a range of field of view/regard. A line-of-sight can be scanned mechanically, electrically, optically, or by a combination of these methods.

Figure 2:
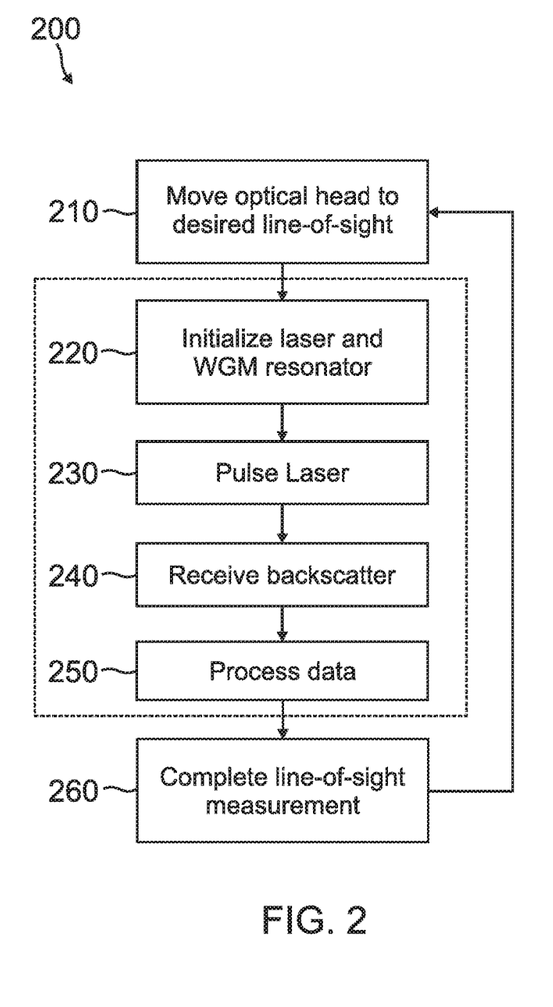
FIG. 2 is a flow diagram of an exemplary data acquisition process, which can be employed by the air data system of FIG. 1.

FIG. 2 is a flow diagram of an exemplary data acquisition process 200, which can be employed by the present air data system. Initially, an optical head of the air data system is move to a desired line-of-sight (block 210). The process 200 then initializes the laser device and the WGM resonator (block 220). The laser device is pulsed through the optical head to an air volume (block 230), and the backscatter light is received by the optical head and WGM resonator (block 240). The resulting data from the received backscatter light is then processed (block 250). A line-of-sight measurement is then completed using the processed data (block 260). The process 200 can be repeated by again moving the optical head to the desired line-of-sight (block 210), and repeating the foregoing steps.

There are several approaches that the air data system can employ to include both frequency scanning (to detect the Doppler shift) and range gating (to resolve spatial variation).

In a first approach, a dynamic WGM frequency discriminator is used with a static laser frequency. This approach involves scanning the WGM resonator to change the optical path length, changing the frequency of the resonance (tuning), and measuring the transmission vs. modulation. This can be done using various techniques. In a mechanical technique, deformation of the WGM resonator can be imposed by heating/cooling the WGM resonator, such as to provide thermal expansion; mechanically pushing on the WGM resonator with an actuator, such as with a piezoelectric device, a micro-electro-mechanical (MEMS) device, or the like; or by varying gas pressure around the WGM resonator. In an optical technique, the WGM resonator's refractive index can be varied by, for example, modulating the refractive index of the resonator cavity by laser heating, or interaction of a second laser beam with the resonator cavity. Alternatively, the WGM resonator can be tuned by other techniques, such as varying proximity of a proof mass to the WGM resonator; allowing a vapor to attach to and detach from the WGM resonator; or varying a cladding index of the WGM resonator.

Figure 3A:
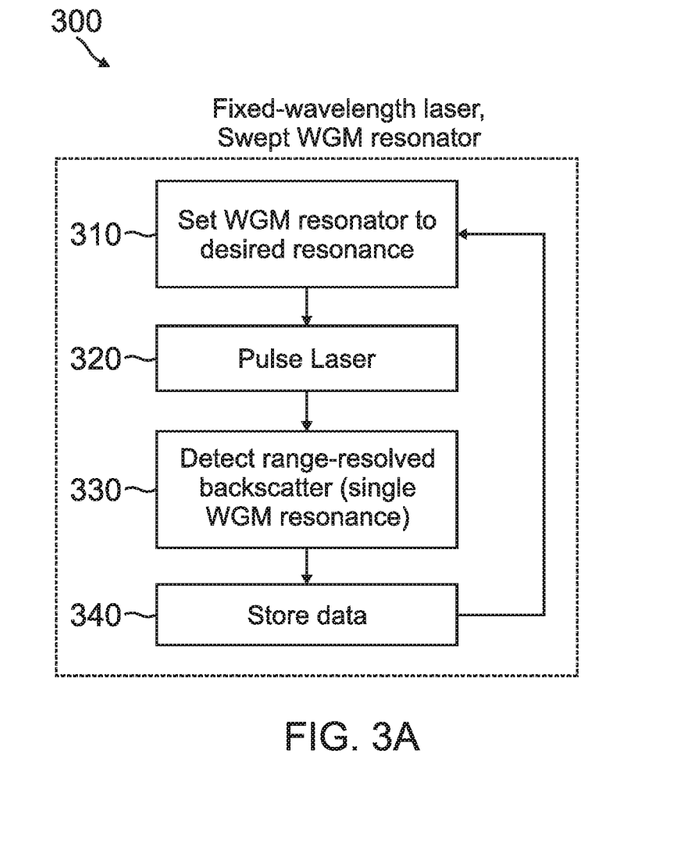
FIG. 3A is a flow diagram of an interrogation process for a fixed-wavelength laser and a single scanned or swept WGM resonator.
Figure 3B:
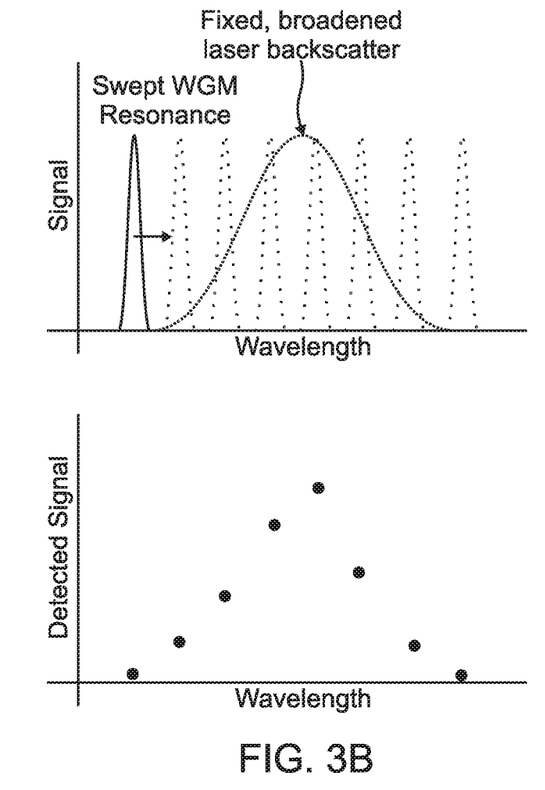
FIG. 3B is a graphical representation of the interrogation process for the fixed-wavelength laser and the single scanned or swept WGM resonator.

The first approach is depicted in FIG. 3A, which is a flow diagram of an interrogation process 300 for a fixed-wavelength laser and a single scanned or swept WGM resonator. FIG. 3B is a graphical representation of the interrogation process for the fixed-wavelength laser and the single scanned or swept WGM resonator. As shown in FIG. 3A, the WGM resonator is set to a desired resonance (block 310), and the laser is then pulsed (block 320). The process 300 then detects a range-resolved backscatter, using the single WGM resonance (block 330), and the resulting data is stored (block 340). The process 300 can be repeated by again setting the WGM resonator to a desired resonance (block 310), and repeating the foregoing steps.

In a second approach, a static WGM frequency discriminator is used with a dynamic laser, which is frequency scanned. The WGM frequency discriminator is controlled to keep it at a fixed resonance, and the transmitted light intensity is monitored as a function of time to resolve the Doppler shift and broadening.

Figure 4A:
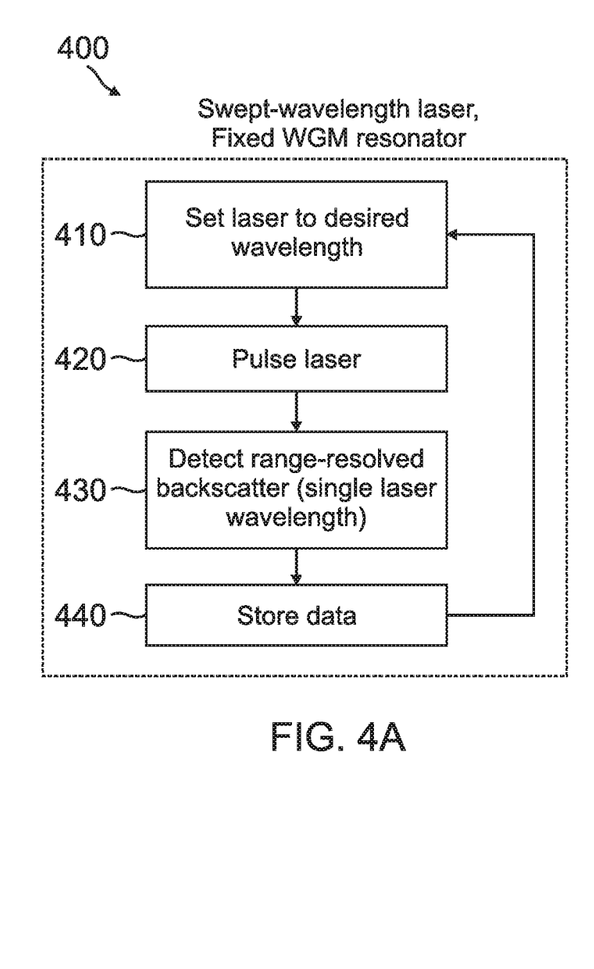
FIG. 4A is a flow diagram of an interrogation process for a scanned or swept wavelength laser and a single fixed WGM resonator.
Figure 4B:
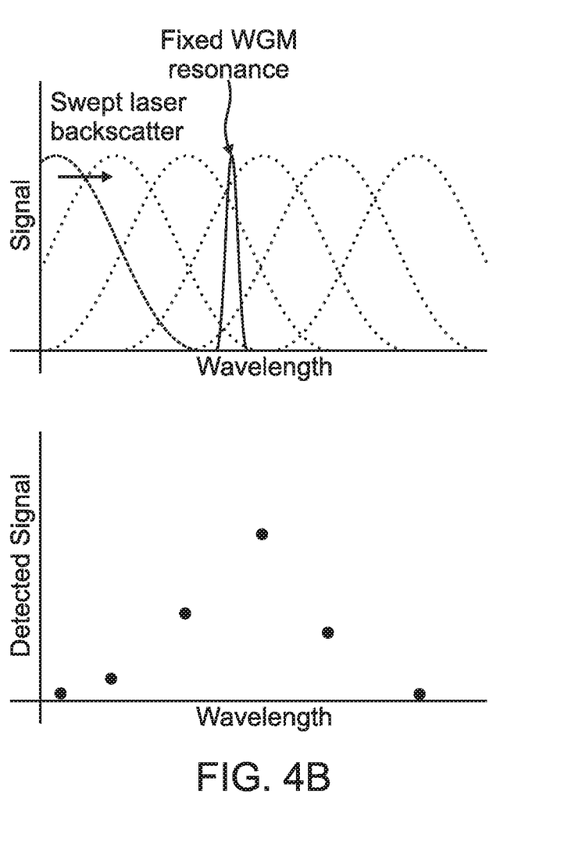
FIG. 4B is a graphical representation of the interrogation process for the scanned or swept wavelength laser and the single fixed WGM resonator.

The second approach is depicted in FIG. 4A, which is a flow diagram of an interrogation process 400 for a scanned or swept wavelength laser and a single fixed WGM resonator. FIG. 4B is a graphical representation of the interrogation process for the scanned or swept wavelength laser and the single fixed WGM resonator. As shown in FIG. 4A, the laser is set to a desired wavelength (block 410), and the laser is then pulsed (block 420). The process 400 then detects a range-resolved backscatter, using the single laser wavelength (block 430), and the resulting data is stored (block 440). The process 400 can be repeated by again setting the laser to a desired wavelength (block 410), and repeating the foregoing steps.

In a third approach, a static WGM frequency discriminator array is used with a static laser frequency. In this approach, an array of WGM resonators with different fixed resonant frequencies are used in an edge detection configuration. The response of the array is measured, and a spectrum is assembled from the detected points.

Figure 5A:
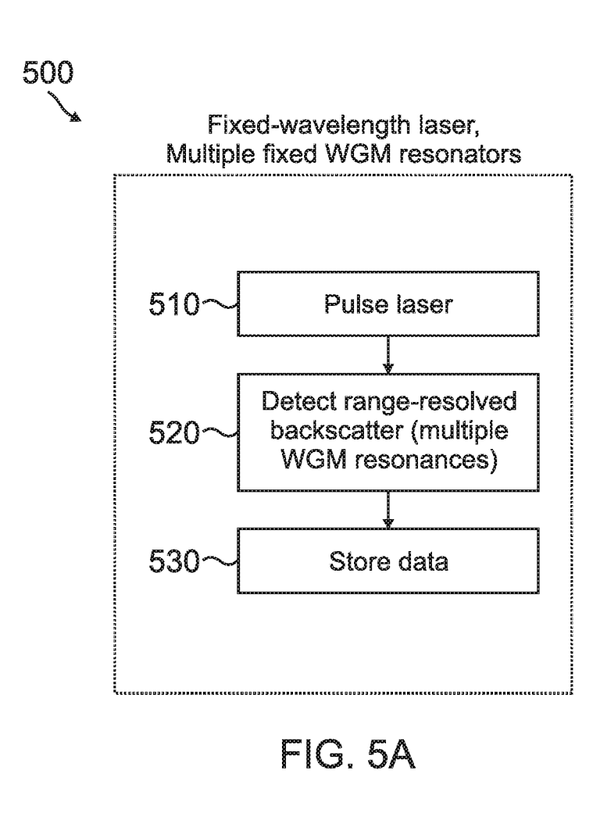
FIG. 5A is a flow diagram of an interrogation process for a fixed-wavelength laser and multiple, fixed WGM resonators.
Figure 5B:
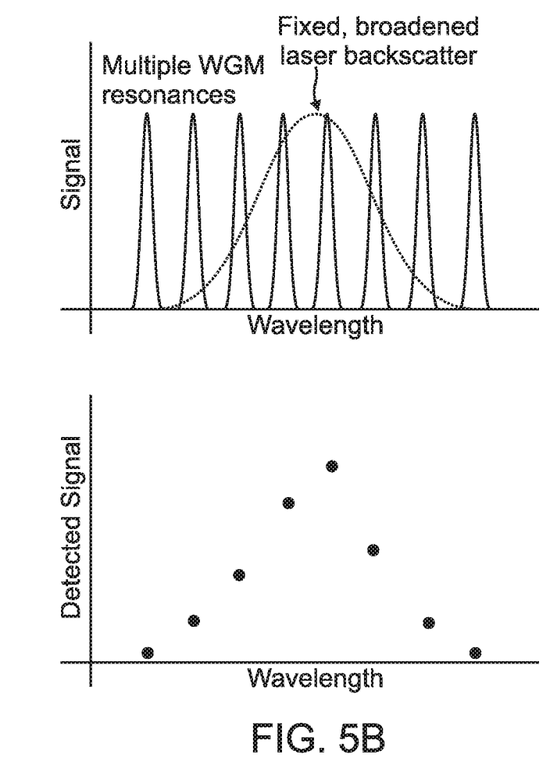
FIG. 5B is a graphical representation of the interrogation process for the fixed-wavelength laser and multiple, fixed WGM resonators.

The third approach is depicted in FIG. 5A, which is a flow diagram of an interrogation process 500 for a fixed-wavelength laser and multiple, fixed WGM resonators. FIG. 5B is a graphical representation of the interrogation process for the fixed-wavelength laser and the multiple, fixed WGM resonators. As shown in FIG. 5A, the process 500 pulses the laser (block 510), and then detects a range-resolved backscatter, using the multiple WGM resonances (block 520). The resulting data is then stored (block 530).

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system for obtaining air data, the system comprising: a laser device on a vehicle that emits laser light pulses; a set of transmit optics configured to transmit the laser light pulses from the laser device into an external air volume adjacent to the vehicle; a set of receive optics configured to collect scattered portions of the laser light pulses from the external air volume; a whispering gallery mode (WGM) frequency discriminator configured to receive the scattered portions of the laser light pulses from the receive optics, the WGM frequency discriminator including at least one WGM resonator configured to output a selected portion of the laser light pulses at one or more optical signal frequencies via tuning the WGM resonator other than by an electro-optic effect; an optical detector configured to sample the selected portion of the laser light pulses from the WGM frequency discriminator, the optical detector configured to convert the sampled laser light pulses to one or more scalar values; and a processing unit operative to receive and record the one or more scalar values from the optical detector.

Example 2 includes the system of Example 1, wherein the laser light pulses have a static optical frequency.

Example 3 includes the system of any of Examples 1-2, wherein the WGM resonator is controlled to have a variable resonant frequency through mechanical tuning or thermal tuning of the WGM resonator.

Example 4 includes the system of any of Examples 1-2, wherein the WGM resonator is tuned by a technique comprising: heating/cooling the WGM resonator; mechanically pushing on the WGM resonator with an actuator; or varying a gas pressure around the WGM resonator.

Example 5 includes the system of any of Examples 1-2, wherein the WGM resonator is tuned by a technique comprising: varying proximity of a proof mass to the WGM resonator; allowing a vapor to attach to and detach from the WGM resonator; or varying a cladding index of the WGM resonator.

Example 6 includes the system of any of Examples 1-5, further comprising a resonator controller operatively coupled to the WGM frequency discriminator, the resonator controller in operative communication with the processing unit.

Example 7 includes the system of any of Examples 1-6, wherein the selected portion of the laser light pulses is dependent on the optical condition and size of the WGM resonator.

Example 8 includes the system of any of Examples 1-7, wherein the processing unit is configured to range resolve air data information at different look angles to derive three-dimensional maps of wind speed, air speed, static pressure, or static temperature.

Example 9 includes the system of any of Examples 1-8, wherein the system includes optical signal frequency scanning to detect a Doppler shift, and range gating to resolve spatial variations.

Example 10 includes the system of any of Examples 1-9, wherein the transmit optics and the receive optics are implemented in an optical head configured for spatial scanning.

Example 11 includes the system of any of Examples 1-10, wherein the vehicle comprises an airborne vehicle.

Example 12 includes a method of obtaining air data for a vehicle, the method comprising: emitting laser light pulses from a laser device on the vehicle; transmitting the laser light pulses through a set of transmit optics into an external air volume adjacent to the vehicle; collecting, by a set of receive optics, scattered portions of the laser light pulses from the external air volume; receiving, in a whispering gallery mode (WGM) frequency discriminator, the scattered portions of the laser light pulses from the receive optics, the WGM frequency discriminator including at least one WGM resonator; outputting a selected portion of the laser light pulses at one or more optical signal frequencies via tuning the WGM resonator other than by an electro-optic effect; sampling, with an optical detector, the selected portion of the laser light pulses from the WGM frequency discriminator; converting the sampled laser light pulses to one or more scalar values in the optical detector; and processing the one or more scalar values to obtain air data for the vehicle.

Example 13 includes the method of Example 12, wherein the WGM resonator is tuned through mechanical or thermal tuning, and the laser light pulses have a static optical frequency.

Example 14 includes the method of Example 12, wherein the WGM resonator is tuned by a technique comprising: heating/cooling the WGM resonator; mechanically pushing on the WGM resonator with an actuator; or varying a gas pressure around the WGM resonator.

Example 15 includes the method of Example 12, wherein the WGM resonator is tuned by a technique comprising: varying proximity of a proof mass to the WGM resonator; allowing a vapor to attach to and detach from the WGM resonator; or varying a cladding index of the WGM resonator.

Example 16 includes the method of any of Examples 12-15, wherein the processing further includes range resolving air data information at different look angles to derive three-dimensional maps of wind speed, air speed, static pressure, or static temperature.

Example 17 includes an air data system for a vehicle, the air data system comprising: a laser device on the vehicle that emits laser light pulses; a set of transmit optics configured to transmit the laser light pulses from the laser device into an external air volume adjacent to the vehicle; a set of receive optics configured to collect scattered portions of the laser light pulses from the external air volume; a whispering gallery mode (WGM) frequency discriminator configured to receive the scattered portions of the laser light pulses from the receive optics, the WGM frequency discriminator including at least one WGM resonator having a fixed resonance frequency and configured to output a selected portion of the laser light pulses at an optical signal frequency corresponding to the fixed resonance frequency; an optical detector configured to sample the selected portion of the laser light pulses from the WGM frequency discriminator, the optical detector configured to convert the sampled laser light pulses to one or more scalar values; and a processing unit operative to receive and record the one or more scalar values from the optical detector.

Example 18 includes the air data system of Example 17, wherein the the laser light pulses are frequency scanned.

Example 19 includes the air data system of Example 17, wherein the laser light pulses have a static optical frequency.

Example 20 includes the air data system of Example 19, wherein the WGM frequency discriminator comprises an array of WGM resonators with different fixed resonant frequencies.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for obtaining air data, the system comprising:
   a laser device on a vehicle, the laser device configured to emit laser light pulses;
   a set of transmit optics configured to transmit the laser light pulses from the laser device into an external air volume adjacent to the vehicle;
   a set of receive optics configured to collect scattered portions of the laser light pulses from the external air volume;
   a whispering gallery mode (WGM) frequency discriminator configured to receive the scattered portions of the laser light pulses from the receive optics, the WGM frequency discriminator including at least one WGM resonator configured to output a selected portion of the laser light pulses at one or more optical signal frequencies via tuning the WGM resonator other than by an electro-optic effect, wherein the WGM resonator is controllable to have a variable resonant frequency;
   an optical detector configured to sample the selected portion of the laser light pulses from the WGM frequency discriminator, the optical detector configured to convert the sampled laser light pulses to one or more scalar values; and
   a processing unit operative to receive and record the one or more scalar values from the optical detector.

2. The system of claim 1, wherein the laser light pulses have a static optical frequency.

3. The system of claim 2, wherein the WGM resonator is controlled to have a variable resonant frequency through mechanical tuning or thermal tuning of the WGM resonator.

4. The system of claim 1, wherein the WGM resonator is tuned by a technique comprising:
   heating/cooling the WGM resonator;
   mechanically pushing on the WGM resonator with an actuator; or
   varying a gas pressure around the WGM resonator.

5. The system of claim 1, wherein the WGM resonator is tuned by a technique comprising:
   varying proximity of a proof mass to the WGM resonator;
   allowing a vapor to attach to and detach from the WGM resonator; or
   varying a cladding index of the WGM resonator.

6. The system of claim 1, further comprising a resonator controller operatively coupled to the WGM frequency discriminator, the resonator controller in operative communication with the processing unit.

7. The system of claim 1, wherein the selected portion of the laser light pulses is dependent on the optical condition and size of the WGM resonator.

8. The system of claim 1, wherein the processing unit is configured to range resolve air data information at different look angles to derive three-dimensional maps of wind speed, air speed, static pressure, or static temperature.

9. The system of claim 1, wherein the system includes optical signal frequency scanning to detect a Doppler shift, and range gating to resolve spatial variations.

10. The system of claim 1, wherein the transmit optics and the receive optics are implemented in an optical head configured for spatial scanning.

11. The system of claim 1, wherein the vehicle comprises an airborne vehicle.

12. A method of obtaining air data for a vehicle, the method comprising:
   emitting laser light pulses from a laser device on the vehicle;
   transmitting the laser light pulses through a set of transmit optics into an external air volume adjacent to the vehicle;
   collecting, by a set of receive optics, scattered portions of the laser light pulses from the external air volume;
   receiving, in a whispering gallery mode (WGM) frequency discriminator, the scattered portions of the laser light pulses from the receive optics, the WGM frequency discriminator including at least one WGM resonator, wherein the WGM resonator is controllable to have a variable resonant frequency;

outputting a selected portion of the laser light pulses at one or more optical signal frequencies via tuning the WGM resonator other than by an electro-optic effect;

sampling, with an optical detector, the selected portion of the laser light pulses from the WGM frequency discriminator;

converting the sampled laser light pulses to one or more scalar values in the optical detector; and processing the one or more scalar values to obtain air data for the vehicle.

13. The method of claim 12, wherein the WGM resonator is tuned through mechanical or thermal tuning, and the laser light pulses have a static optical frequency.

14. The method of claim 12, wherein the WGM resonator is tuned by a mechanical technique comprising:
heating/cooling the WGM resonator;
mechanically pushing on the WGM resonator with an actuator; or
varying a gas pressure around the WGM resonator.

15. The method of claim 12, wherein the WGM resonator is tuned by a technique comprising:
varying proximity of a proof mass to the WGM resonator;
allowing a vapor to attach to and detach from the WGM resonator; or
varying a cladding index of the WGM resonator.

16. The method of claim 12, wherein the processing further includes range resolving air data information at different look angles to derive three-dimensional maps of wind speed, air speed, static pressure, or static temperature.

17. An air data system for a vehicle, the air data system comprising:
a laser device on the vehicle, the laser device configured to emit laser light pulses;
a set of transmit optics configured to transmit the laser light pulses from the laser device into an external air volume adjacent to the vehicle;
a set of receive optics configured to collect scattered portions of the laser light pulses from the external air volume;
a whispering gallery mode (WGM) frequency discriminator configured to receive the scattered portions of the laser light pulses from the receive optics, the WGM frequency discriminator comprising an array of WGM resonators with different fixed resonant frequencies and configured to output a selected portion of the laser light pulses at respective optical signal frequencies corresponding to the different fixed resonance frequencies;
an optical detector configured to sample the selected portion of the laser light pulses from the WGM frequency discriminator, the optical detector configured to convert the sampled laser light pulses to one or more scalar values; and
a processing unit operative to receive and record the one or more scalar values from the optical detector.

18. The air data system of claim 17, wherein the laser light pulses are frequency scanned.

19. The air data system of claim 17, wherein the laser light pulses have a static optical frequency.

* * * * *